No. 890,935. PATENTED JUNE 16, 1908.
W. S. ROUNDS & D. HOLLAND.
CONDUIT BOX.
APPLICATION FILED SEPT. 26, 1907.

Warren S. Rounds,
Daniel Holland,
Inventors

Witnesses

By
Attorneys

UNITED STATES PATENT OFFICE.

WARREN S. ROUNDS AND DANIEL HOLLAND, OF SARATOGA SPRINGS, NEW YORK.

CONDUIT-BOX.

No. 890,935.

Specification of Letters Patent.

Patented June 16, 1908.

Application filed September 26, 1907. Serial No. 394,695.

*To all whom it may concern:*

Be it known that we, WARREN S. ROUNDS and DANIEL HOLLAND, citizens of the United States, residing at Saratoga Springs, in the county of Saratoga and State of New York, have invented a new and useful Conduit-Box, of which the following is a specification.

This invention relates to outlet boxes for electrical conduits and has for its object to provide a strong, durable and thoroughly efficient device of this character in which the pipe sections are clamped within the box without the necessity of threading said sections or without the employment of nuts, clips and similar fastening devices.

A further object of the invention is to provide a conduit box including an elongated body portion having its opposite ends provided with split clamping members pierced by alined openings for the reception of the adjacent conduit sections, said sections being locked within the box by contracting the clamping members at the split ends thereof.

A further object is to provide the clamping members with inwardly extending lugs which form supports for the cover or closure of the box.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
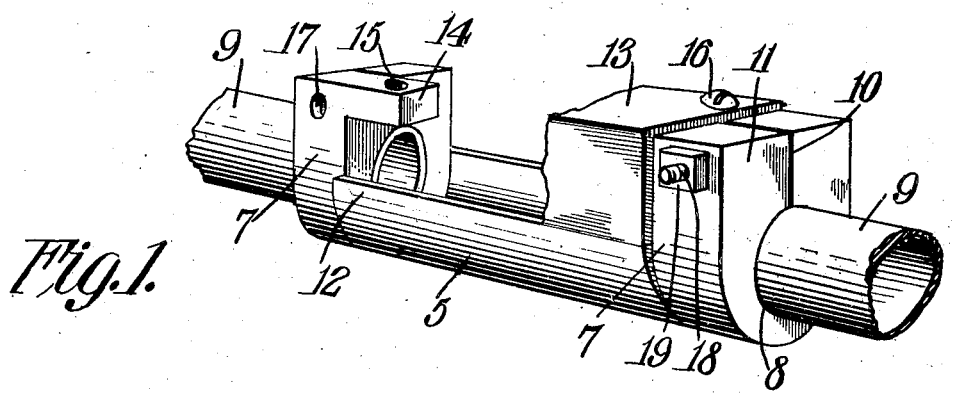
Figure 2:
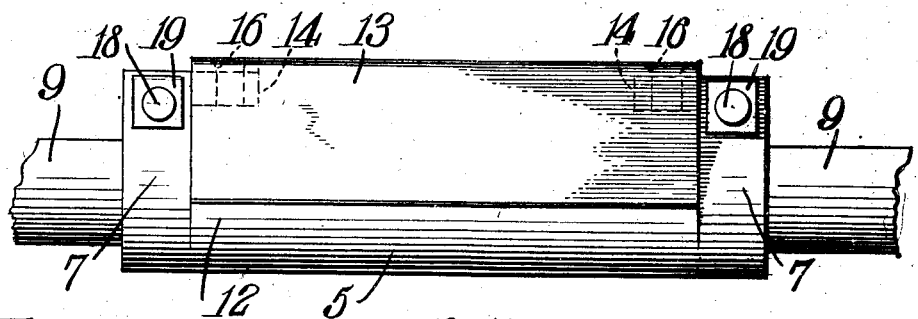
Figure 3:
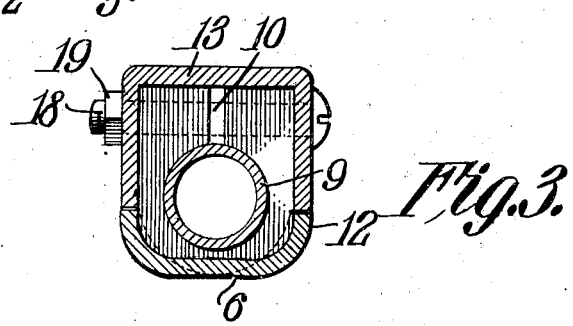

In the accompanying drawings forming a part of this specification: Figure 1 is a perspective view of a conduit box constructed in accordance with my invention. Fig. 2 is a side elevation of the same. Fig. 3 is a transverse sectional view.

Similar numerals of reference indicate corresponding parts in all of the figures of the drawings.

The improved conduit box forming the subject matter of the present invention includes an elongated body portion 5 preferably curved or bowed in cross section, as shown, and having its lower face flattened at 6 to assist in preventing tilting movement thereof. Extending vertically from the opposite ends of the body portion 5 and preferably formed integral therewith are spaced clamping members 7 having alined openings 8 formed therein for the reception of the ends of the adjacent conduit sections 9. The clamping members 7 are substantially U shaped in form and are each split longitudinally at 10 to form spaced clamping arms 11, the split portion being extended from the adjacent opening 8 to the top of the clamping member, as shown. The opposite longitudinal edges of the body portion 5 terminate short of the upper ends of the clamping members to form shoulders 12 adapted to receive and support the adjacent edges of a removable cover or closure 13.

Extending inwardly from one of the arms 11 of each clamping member is a lug 14 having an opening or perforation 15 formed therein the walls of which are threaded for engagement with a screw or similar fastening device 16 which serves to secure the cover in position on the conduit box.

The clamping arms 11 are pierced by transversely alined openings 17 adapted to receive a bolt 18 the threaded end of which is engaged by a nut 19 so that by adjusting the nut on the bolt the free ends of the arms 11 at the split portion 10 may be forced in engagement with the adjacent conduit sections 9 and thus securely lock said sections within the conduit box.

It will thus be seen that by inserting the pipe sections in the openings 8 and adjusting the nuts on the bolts 18 the conduit sections may be rigidly combined with the box without the necessity of threading said sections and without the employment of clips, bushings, packing rings and similar devices.

In order to obtain access to the interior of the box it is merely necessary to remove the screws 16 when the cover or closure 13 may be lifted off the box so as to expose the wires or other electrical conductors.

The conduit boxes may be made in different sizes and shapes and if desired the walls of the openings 8 may be provided with a packing ring or gasket to assist in preventing accidental displacement of the conduit sections.

Having thus described the invention what is claimed is:

1. A conduit box including a body portion, split clamping members secured to the opposite ends of the body portion and having openings formed therein for the reception of the ends of the adjacent conduit sections, diagonally disposed perforated lugs extending inwardly from the clamping members, means for clamping said members in engagement with the conduit sections, a cover interposed between the clamping members and resting on said lugs and fastening devices extending through the cover and engaging the perforations in the lugs for locking the cover in position on the box.

2. A conduit box including a body portion having its side walls cut away to form longitudinal shoulders and its opposite ends provided with clamping members extending above the shoulders and having openings formed therein for the reception of the ends of the adjacent conduit sections, said clamping members being split longitudinally to form co-acting arms, a cover interposed between the clamping members and resting on said shoulders and a bolt piercing the arms for clamping the latter in engagement with the conduit sections.

3. A conduit box including a body portion curved transversely and provided with oppositely disposed clamping members extended vertically above the longitudinal edges of the body portion to form an intermediate recess, said clamping members being split longitudinally and provided with openings for the reception of the ends of the adjacent conduit sections, a cover resting on the adjacent longitudinal edges of the body portion and forming a closure for said recess, and means extending transversely through the clamping members at the split portions thereof for clamping said members in engagement with the conduit sections.

4. A conduit box including an elongated body portion having longitudinally split clamping members extending vertically from the opposite ends of the body portion and projecting above the adjacent longitudinal edges of the body portion to form an intermediate recess, said clamping members having openings formed therein for the reception of the ends of the adjacent conduit sections, lugs projecting inwardly from the clamping members, a cover resting on the adjacent longitudinal edges of the body portion and forming a closure for the recess, and means extending transversely through the clamping members at the split portion thereof for clamping said members in engagement with the conduit sections.

5. A conduit box including an elongated body portion curved transversely in cross section and provided with a flattened base, substantially U shaped clamping members extending vertically from the opposite ends of the body portion and projecting above the adjacent longitudinal edges thereof, there being openings formed in the clamping members for the reception of the ends of the adjacent conduit sections and having vertical slots extending from the tops of the clamping members and intersecting the openings to form clamping arms, fastening devices piercing said arms for clamping the latter in engagement with the conduit sections, a lug extending inwardly from one arm of each clamping member, a removable cover having its upper portion resting on the lugs and its lower longitudinal edges bearing against the adjacent edges of the body portion, and fastening devices extending through the cover and engaging the lugs for locking the cover against accidental displacement.

In testimony that we claim the foregoing as our own, we have hereto affixed our signatures in the presence of two witnesses.

WARREN S. ROUNDS.
DANIEL HOLLAND.

Witnesses:
R. G. CLARK,
GEORGE S. KETCHUM.